United States Patent
Hagelin et al.

(10) Patent No.: US 8,903,572 B1
(45) Date of Patent: Dec. 2, 2014

(54) AIRCRAFT LANDING EVALUATION SYSTEM

(75) Inventors: Jack S. Hagelin, Woodinville, WA (US); Jonathan R. Lepere, Everett, WA (US); Richard J. Reuter, Seattle, WA (US); Michael R. Anderegg, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 1041 days.

(21) Appl. No.: 12/539,031

(22) Filed: Aug. 11, 2009

(51) Int. Cl.
*G06F 7/70* (2006.01)

(52) U.S. Cl.
USPC .......... 701/16; 701/18; 73/178 T; 244/100 R; 706/12

(58) Field of Classification Search
USPC ............... 701/16, 3, 29.5, 8, 33.4, 36, 18; 244/111, 100 R, 180–181, 110 A, 110 E, 244/182–183; 340/745, 945, 970, 977; 73/492, 11.01, 12.01, 787, 178 T; 706/12; 342/33
See application file for complete search history.

(56) References Cited

U.S. PATENT DOCUMENTS

| | | | | |
|---|---|---|---|---|
| 3,624,598 | A * | 11/1971 | Foster | 340/957 |
| 3,712,122 | A * | 1/1973 | Harris et al. | 340/945 |
| 4,249,158 | A * | 2/1981 | Basov et al. | 340/953 |
| 4,259,658 | A * | 3/1981 | Basov et al. | 340/951 |
| 4,956,780 | A * | 9/1990 | Sankrithi et al. | 701/16 |
| 5,020,747 | A * | 6/1991 | Orgun et al. | 244/187 |
| 5,111,403 | A * | 5/1992 | Orgun et al. | 701/16 |
| 5,113,346 | A * | 5/1992 | Orgun et al. | 701/16 |
| 5,206,652 | A * | 4/1993 | Hoyt et al. | 342/52 |
| 5,260,702 | A * | 11/1993 | Thompson | 340/970 |
| 6,173,218 | B1 * | 1/2001 | Vian | 701/1 |
| 6,311,108 | B1 * | 10/2001 | Ammar et al. | 701/16 |
| 6,382,556 | B1 * | 5/2002 | Pham | 244/6 |
| 6,430,480 | B1 * | 8/2002 | Ammar et al. | 701/16 |
| 6,480,770 | B1 * | 11/2002 | Wischmeyer | 701/32.9 |
| 6,591,171 | B1 * | 7/2003 | Ammar et al. | 701/16 |
| 6,676,075 | B2 * | 1/2004 | Cowan et al. | 244/100 R |
| 7,085,630 | B2 * | 8/2006 | Ryan et al. | 701/16 |

(Continued)

OTHER PUBLICATIONS

Tolerances in automatic landing: an analysis of the effect of equipment tolerances, changes in aircraft configuration and variations in wind conditions; Henley, M.G.; Radio and Electronic Engineer; vol. 29, Issue: 6; Digital Object Identifier: 10.1049/ree.1965.0068; Publication Year: 1965, pp. 378-385.*

(Continued)

*Primary Examiner* — Cuong H Nguyen
(74) *Attorney, Agent, or Firm* — Toler Law Group, PC

(57) ABSTRACT

In one embodiment an aircraft landing evaluation system comprises a first sensor to detect at least one landing trigger condition in an aircraft landing environment and a second sensor to detect at least one touchdown trigger condition in the aircraft landing environment. The system further comprises a processor coupled to the first sensor and the second sensor, and a memory module coupled to the processor. The memory module comprises logic instructions stored in a computer readable medium which, when executed, configure the processor to collect a plurality of flight parameters associated with the aircraft landing, and to collect a one or more additional flight parameters associated with the aircraft landing. A subset of the plurality of flight parameters are stored in a computer readable memory module coupled to the processing device, and may be presented on a display device coupled to the processing device.

21 Claims, 5 Drawing Sheets

(56) References Cited

U.S. PATENT DOCUMENTS

| | | | |
|---|---|---|---|
| 7,227,970 B2 * | 6/2007 | Calderwood et al. | 381/412 |
| 7,274,309 B2 * | 9/2007 | Nance | 340/960 |
| 7,274,310 B1 * | 9/2007 | Nance | 340/960 |
| 7,277,970 B2 | 10/2007 | Ellerbrock et al. | |
| 7,839,322 B2 * | 11/2010 | Filias et al. | 342/33 |
| 8,042,765 B1 * | 10/2011 | Nance | 244/100 R |
| 8,123,163 B2 * | 2/2012 | McCoskey et al. | 244/110 A |
| 8,180,504 B1 * | 5/2012 | Nance | 701/5 |
| 8,224,507 B2 * | 7/2012 | Edwards et al. | 701/16 |
| 2004/0167685 A1 * | 8/2004 | Ryan et al. | 701/16 |
| 2004/0176887 A1 * | 9/2004 | Kent et al. | 701/30 |
| 2005/0182531 A1 * | 8/2005 | Ryan et al. | 701/16 |
| 2005/0261813 A1 * | 11/2005 | Ryan et al. | 701/16 |
| 2005/0261814 A1 * | 11/2005 | Ryan et al. | 701/16 |
| 2006/0284008 A1 * | 12/2006 | Nance | 244/100 R |
| 2007/0235585 A1 * | 10/2007 | Nance | 244/100 R |
| 2007/0290918 A1 * | 12/2007 | Filias et al. | 342/29 |
| 2008/0017753 A1 * | 1/2008 | Clark | 244/81 |
| 2008/0258014 A1 * | 10/2008 | McCoskey et al. | 244/221 |
| 2009/0125169 A1 * | 5/2009 | Edwards et al. | 701/16 |
| 2010/0288878 A1 * | 11/2010 | Bennett | 244/104 FP |
| 2011/0046825 A1 * | 2/2011 | Lastere et al. | 701/16 |

OTHER PUBLICATIONS

Autonomous Landing and Hazard Avoidance Technology (ALHAT); Epp, C.D.; Robertson, E.A.; Brady, T.; Aerospace Conference, 2008 IEEE; Digital Object Identifier: 10.1109/AERO.2008.4526297; Publication Year: 2008 , pp. 1-7.*

Visual Simulation of Aircraft Carrier Assistant Landing System; Yongjun Qiao; Xiaoming Bai; Xiaofang Xie; Yongsheng Li Computational Intelligence and Industrial Application, 2008. PACIIA '08. Pacific-Asia Workshop on; vol. 2 Digital Object Identifier: 10.1109/PACIIA.2008.57; Publication Year: 2008 , pp. 714-717.*

Comparison of manual and autopilot breakout maneuvers with three closely spaced parallel runway approaches; Verma, S.; Lozito, S.; Ballinger, D.; Kozon, T.; Hardy, G.; Resnick, H.; Digital Avionics Systems Conference, 2009. DASC '09. IEEE/AIAA 28th Digital Object Identifier: 10.1109/DASC.2009.5347457;Publication Year: 2009 , pp. 5.D.3-1-5.*

Characterization of a flight control computer with rollback recovery; Malekpour, M. ; Torres, W.; Digital Avionics Systems Conference, 2000. Proceedings. DASC. The 19th; vol. 1; DOI: 10.1109/DASC.2000.886930; Publication Year: 2000 , pp. 3C4/1-3C4/8 vol. 1.*

Development and simulation of an F/A-18 fuzzy logic automatic carrier landing system; Steinberg, Marc; Fuzzy Systems, 1993., Second IEEE International Conference on; Digital Object Identifier: 10.1109/FUZZY.1993.327544; Publication Year: 1993 , pp. 797-802 vol. 2.*

Automatic path planning and control design for autonomous landing of UAVs using dynamic inversion; Singh, S. ; Padhi, R. American Control Conference, 2009. ACC '09.; Digital Object Identifier: 10.1109/ACC.2009.5160444; Publication Year: 2009 , pp. 2409-2414.*

Intelligent landing of Unmanned Aerial Vehicle using hierarchical fuzzy control; Liu Zhi ; Wang Yong; Aerospace Conference, 2012 IEEE; Digital Object Identifier: 10.1109/AERO.2012.6187321; Publication Year: 2012 , pp. 1-12.*

* cited by examiner

US 8,903,572 B1

AIRCRAFT LANDING EVALUATION SYSTEM

FIELD OF THE DISCLOSURE

This invention relates to aircraft landing evaluation systems and more particularly to systems and methods to determine whether an aircraft has experienced a hard landing.

BACKGROUND

Existing techniques to determine whether an aircraft experienced a hard landing rely primarily on a subjective assessment by the flight crew. Because of the lack of reliable quantitative data, errors may be made in this assessment. As a result, an airplane may be grounded unnecessarily, at a considerable cost of time and money. Improved techniques to determine whether a hard landing has occurred may find utility.

SUMMARY

In various aspects, aircraft landing evaluation systems are provided. In some embodiments, aircraft landing evaluation systems as described herein collect data prior to and during a landing, analyze the data, and present portions of the data on a display which may be referenced by flight crew to aid in determining whether a landing qualifies as a hard landing. In some embodiments a hard landing warning may be presented on a user interface when one or more parameters associated with the landing indicates that the aircraft experienced a hard landing. Flight crew can use the data presented on the user interface to determine whether an aircraft should be removed from active duty for inspection.

Thus, in one aspect there is provided a method of evaluating an aircraft landing. In one embodiment, the method comprises detecting at least one landing trigger condition in an aircraft landing environment, and in response to the trigger condition, collecting, in a processing device, a plurality of flight parameters associated with the aircraft landing. The method further comprises detecting at least one touchdown trigger condition in the aircraft landing environment, and in response to the touchdown trigger condition, collecting, in the processing device, one or more additional flight parameters associated with the aircraft landing. The method further comprises storing a subset of the plurality of flight parameters in a computer readable memory module coupled to the processing device, and presenting one or more of the plurality of flight parameters on a display device coupled to the processing device.

In another aspect there is provided an aircraft landing evaluation system. In one embodiment, the system comprises a first sensor to detect at least one landing trigger condition in an aircraft landing environment and a second sensor to detect at least one touchdown trigger condition in the aircraft landing environment. The system further comprises a processor coupled to the first sensor and the second sensor, and a memory module coupled to the processor. The memory module comprises logic instructions stored in a computer readable medium which, when executed, configure the processor to collect a plurality of flight parameters associated with the aircraft landing, and to collect one or more additional flight parameters associated with the aircraft landing. A subset of the plurality of flight parameters are stored in a computer readable memory module coupled to the processing device, and may be presented on a display device coupled to the processing device.

In another aspect, there is provided an aircraft. In one embodiment, the aircraft comprises an aircraft landing evaluation system. In one embodiment, the system comprises a first sensor to detect at least one landing trigger condition in an aircraft landing environment and a second sensor to detect at least one touchdown trigger condition in the aircraft landing environment. The system further comprises a processor coupled to the first sensor and the second sensor, and a memory module coupled to the processor. The memory module comprises logic instructions stored in a computer readable medium which, when executed, configure the processor to collect a plurality of flight parameters associated with the aircraft landing, and to collect one or more additional flight parameters associated with the aircraft landing. A subset of the plurality of flight parameters are stored in a computer readable memory module coupled to the processing device, and may be presented on a display device coupled to the processing device.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

DETAILED DESCRIPTION

Described herein are exemplary aircraft landing evaluation systems and methods evaluate aircraft landings. In some embodiments, a processing device collects data from one or more sensors prior to and during the landing. The data may be stored in a computer readable memory. As described herein, portions data may be presented on a user interface, e.g., a display device, either in response to a query from flight crew or automatically, e.g., when one or more landing threshold parameters are exceeded. Based on the data presented, flight crew may then make an informed decision regarding whether a particular landing should be treated as a hard landing. In response to a hard landing, an aircraft may be removed from active duty for inspection.

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

Figure 1:
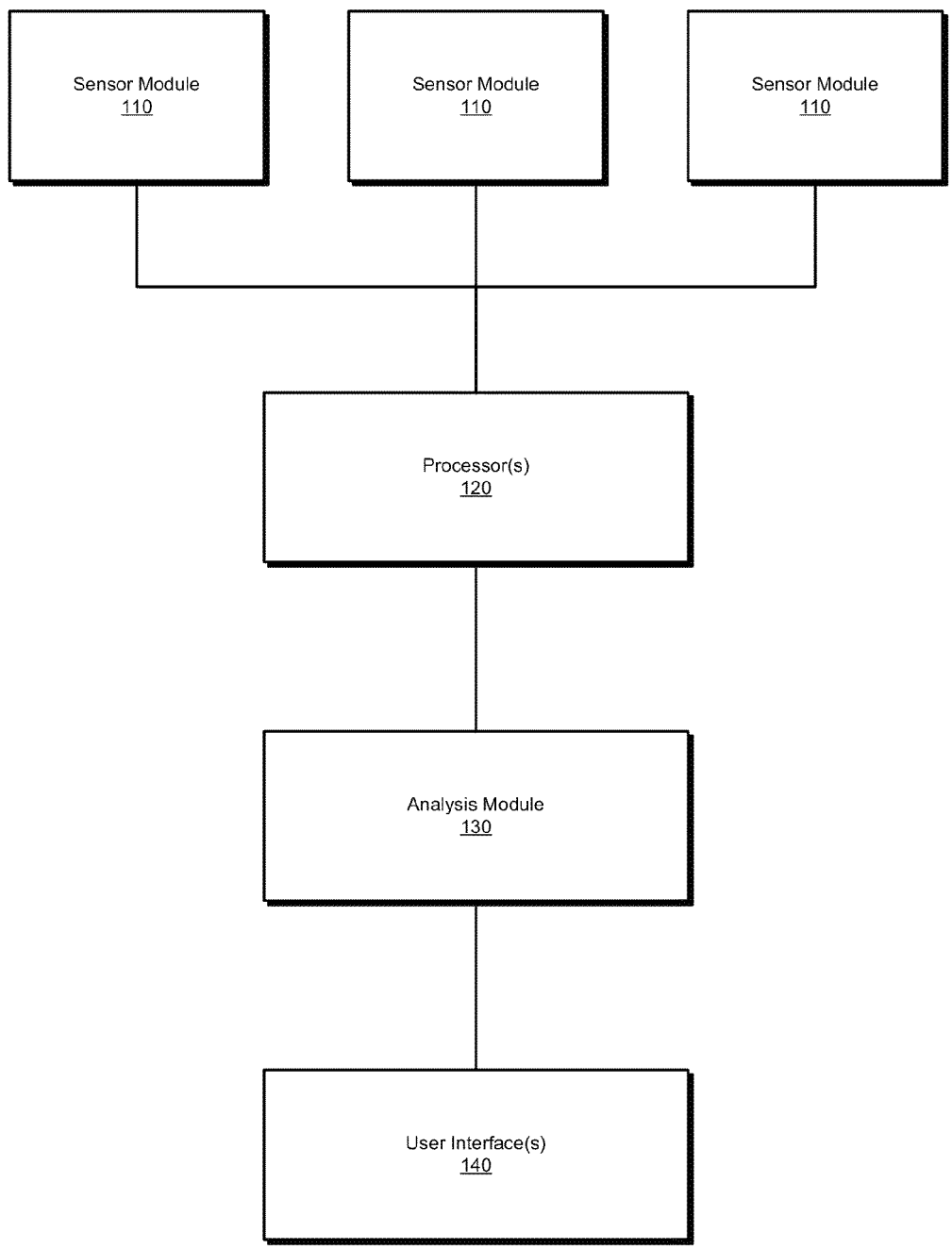
FIG. 1 is a schematic illustration of an aircraft landing evaluation system in accordance with some embodiments.

FIG. 1 is a schematic illustration of an aircraft landing evaluation system in accordance with some embodiments. Referring to FIG. 1, in one embodiment an aircraft landing evaluation system comprises one or more sensor modules 110 communicatively coupled to one or more processor(s) 120.

The particular form of the communication link between the sensor module(s) 110 and the processor(s) 120 is not critical. In some embodiments, the sensor module(s) 110 may be communicatively coupled to the processor(s) 120 by a communication bus, a fiber optical cable, or by a wireless communication link.

Processor(s) 120 may comprise, or may be communicatively coupled to, an analysis module 130. In some embodiments, analysis module 130 may be implemented by logic instructions stored in a computer readable medium which may be executed on a general purpose processing device, e.g., a microprocessor or the like. In alternate embodiments the signal analysis module may be implemented by logic instructions stored in a configurable processing device, e.g., a field programmable gate array (FPGA) or the like. In alternate embodiments, analysis module 130 may be reduced to hardwire logic circuitry, e.g., an application specific integrated circuit or the like.

Analysis module 130 comprises, or may be communicatively coupled to, a user interface(s) 140. In some embodiments, user interface 150 may comprise a mechanism to present a visual display such as a liquid crystal display (LCD) or a cathode ray tube (CRT) display. Alternatively, or in addition, an audible warning may be presented. Various aspects of the system and its operation are described with reference to FIGS. 2-5.

Figure 2:
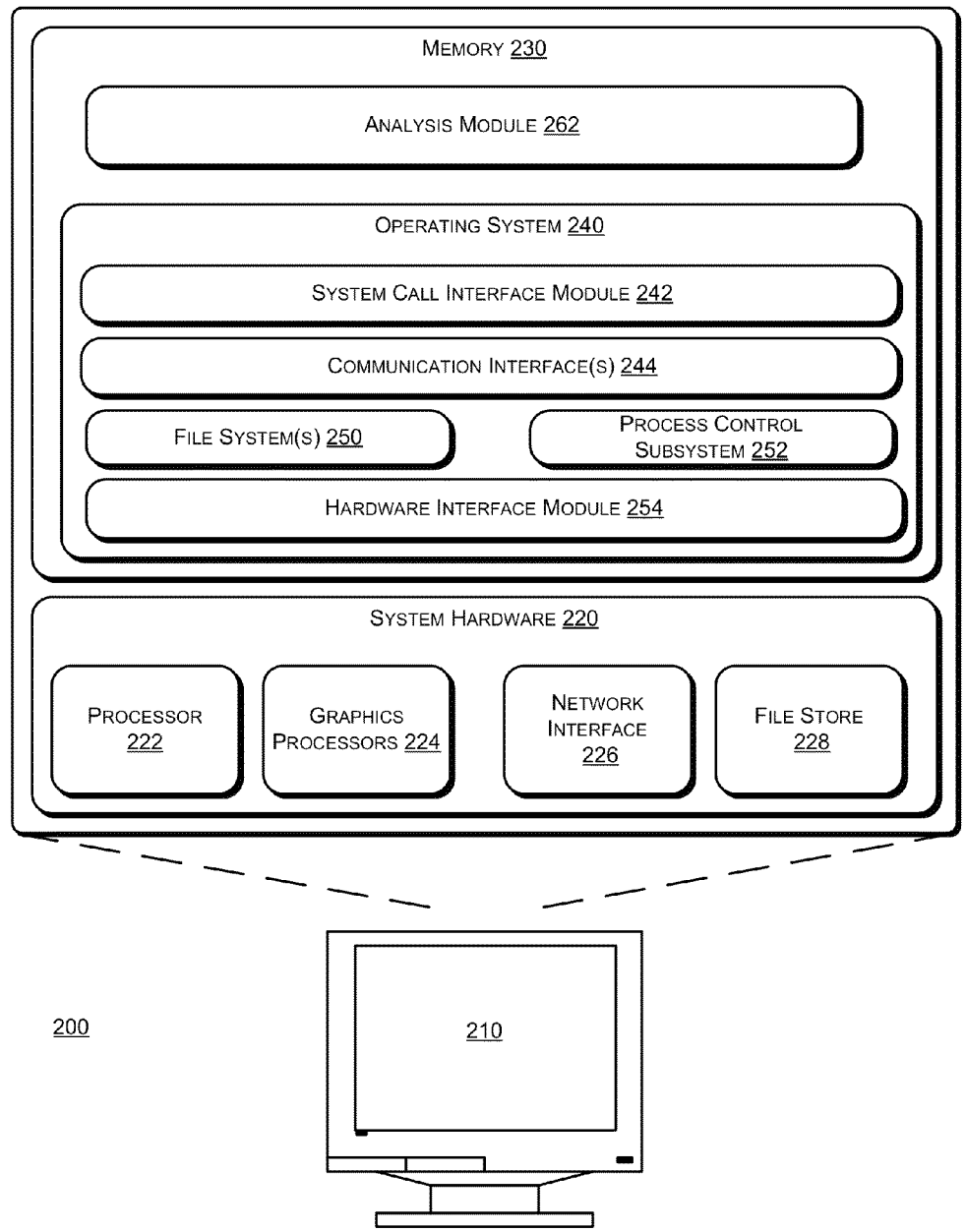
FIG. 2 is a schematic illustration of a processing device which may be used in an environmental sensor system, according to embodiments.

FIG. 2 is a schematic illustration of a processing device which may be used in an aircraft landing evaluation system, according to embodiments. In some embodiments, the analysis module 262 may be implemented as logic instructions which execute on a general purpose processor, e.g., a computing device. In one embodiment, system 200 includes system hardware 220 and memory 230, which may be implemented as random access memory and/or read-only memory.

System hardware 220 may include one or more processors 222, a graphics processor 224, network interfaces 226, and a file store 228. As used herein, the term "processor" should be construed to include any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor 224 may function as adjunct processor that manages graphics and/or video operations. Graphics processors 224 may be integrated onto a motherboard of the processing device 200 or may be coupled via an expansion slot on the motherboard.

In one embodiment, network interface 226 could be a wired interface such as an Ethernet interface or a wireless interface such as an IEEE 802.11a, b or g-compliant interface. Another example of a wireless interface would be a general packet radio service (GPRS) interface.

A file store 228 which may be implemented as, e.g., non-volatile memory, one or more hard drives, CD-ROM drives, DVD-ROM drives, or other types of storage devices. File store 228 may also be external to system 200 such as, e.g., one or more external hard drives, network attached storage, or a separate storage network.

System 200 may include, or be coupled to, a display device 210. In some embodiments, display device 210 may comprise a liquid crystal display (LCD) device, a cathode ray tube (CRT) device, or the like. Display 210 may comprise, or be coupled to, one or more auditory interfaces, e.g., a speaker.

Memory 230 may include an operating system 240 for managing operations of system 200. In one embodiment, operating system 240 includes a hardware interface module 254 that provides an interface to system hardware 220. In addition, operating system 240 may include a file system 250 that manages files used in the operation of system 200 and a process control subsystem 252 that manages processes executing on system 200.

Operating system 240 may include (or manage) one or more communication interfaces that may operate in conjunction with system hardware 220 to receive data packets and/or data streams from a remote source. Operating system 240 may further include a system call interface module 242 that provides an interface between the operating system 240 and one or more application modules resident in memory 230. Operating system 240 may be embodied as a UNIX operating system or any derivative thereof (e.g., Linux, Solaris, etc.) or as a Windows® brand operating system, or other operating systems.

In one embodiment, memory 230 includes an analysis module 262 to evaluate landing conditions using at least one signal characteristic of a signal transmitted from the sensor module 110 to the base station processor(s) 120. The analysis module 262 may correspond to the signal analysis module 130 depicted in FIG. 1. In one embodiment, a signal analysis module 262 may include logic instructions encoded in a computer-readable storage medium which, when executed by processor 222, cause the processor 222 to analyze one or more signal characteristics to determine an environmental condition from the signal.

Having now described structural components of an aircraft landing evaluation system, additional details about the operations implemented by components of the system are described below.

Figure 3:
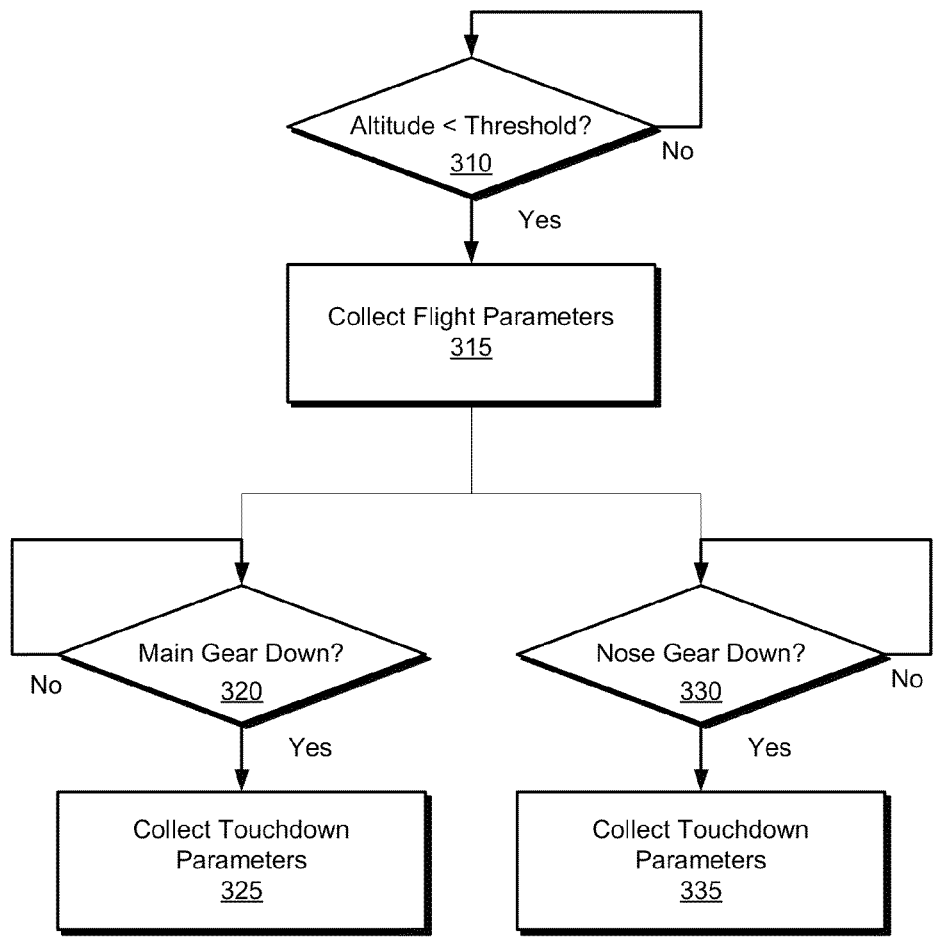
FIGS. 3-4 are flowcharts illustrating operations in a method of evaluating an aircraft landing, according to embodiments.
Figure 4:
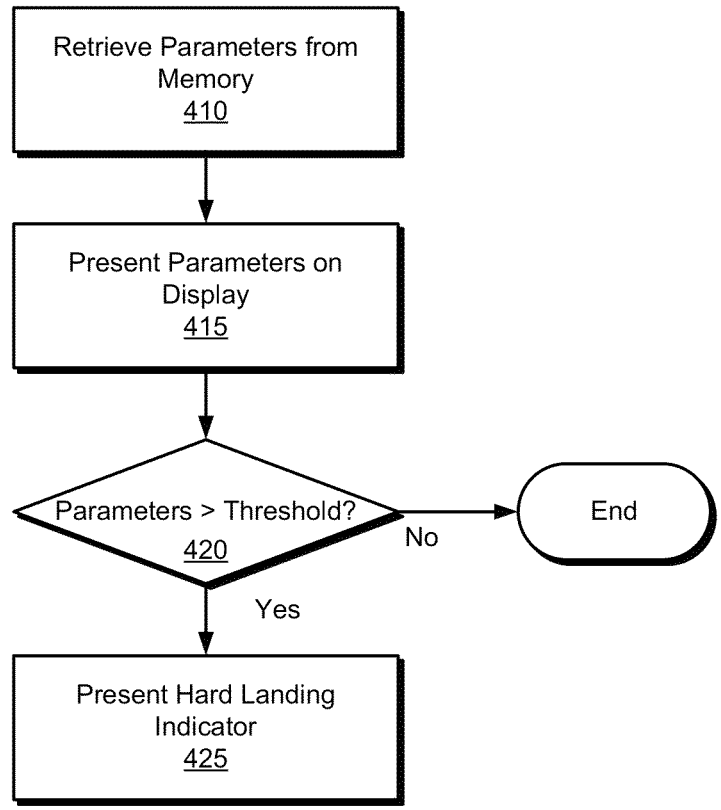

FIGS. 3-4 are flowcharts illustrating operations in a method of evaluating an aircraft landing, according to embodiments. Referring first to FIG. 3, in one embodiment the operations depicted in FIG. 3 may be implemented by the analysis module 262 during the landing process. At operation 310 it is determined whether the aircraft's altitude is less than a threshold. For example, in one embodiment the analysis module initiates the operations of FIG. 3 when the radio altitude of the aircraft transitions to below twenty (20) feet. If, at operation 310 the altitude is not below the threshold, then the analysis module continues to monitor the aircraft altitude.

By contrast, if at operation 310 the altitude is less than a threshold value then control passes to operation 315 and the analysis module collects one or more flight parameters associated with the aircraft. In one embodiment, the analysis module collects data for the gross weight, the center of gravity (CG), the center of gravity (CG) sink rate, the pitch attitude, the airplane true heading, the selected runway heading, the roll attitude of the aircraft, the body roll rate, the CG norm acceleration, and the body pitch rate of the aircraft. As used herein, the term CG sink rate refers to the rate of closure with the ground (in the inertial frame) of the center of gravity of the aircraft. Similarly, the term CG norm acceleration refers to the acceleration perpendicular to the aircraft longitudinal and lateral axes (i.e., vertical acceleration measured in the aircraft reference system). In one embodiment, the CG norm acceleration and body pitch rate are sampled repeatedly and the samples are stored in arrays in a computer readable memory such that peak values can be determined. Other parameters are overwritten continuously until the trigger then stored in a non-volatile memory module. In some embodiments the crab angle is computed using airplane true heading and selected runway heading data. This data may be collected from one or more flight monitoring systems on the aircraft. The data may be sampled as the plane descends and successive measurements may be stored in a computer readable memory module, such as file store 228 of system 200.

Control then passes to operations 320 and 330, which may be implemented concurrently. At operation 320 it is determined whether the main gear has touched down. As used herein, the terms "main gear" refer to the aft landing gear, which in a normal landing environment are the first gear to touchdown. In one embodiment, the main gear touchdown is triggered when the first truck tilt becomes untitled. If, at operation 320, the main gear is not down, then the system continues to monitor for the main gear to be down.

By contrast, if at operation 320 the main gear is down, then control passes to operation 325 and one or more touchdown parameters are collected. In one embodiment the analysis module transfers previously sampled flight parameters into a non-volatile memory module. In addition, the analysis module determines the maximum CG norm acceleration for a predetermined period of time and records the highest positive value during the time period in a non-volatile memory module.

At operation 330 it is determined whether the nose gear has touched down. As used herein, the terms "nose gear" refer to the forward landing gear, which in a normal landing environment are the last gear to touchdown. In one embodiment, the nose gear touchdown is triggered when the aircraft pitch attitude transitions below three degrees. If, at operation 330, the nose gear is not down, then the system continues to monitor for the nose gear to be down.

By contrast, if at operation 330 the nose gear is down, then control passes to operation 335 where the previously collected flight parameters are stored to non-volatile memory. In one embodiment the analysis module transfers the UTC for the nose gear into a non-volatile memory module. In addition, the analysis module determines the maximum negative body pitch rate from the previously collected data and records the highest negative value during the time period in a non-volatile memory module.

Thus, the operations of FIG. 3 permit the analysis module 262 to collect and store various flight and touchdown parameters during the landing process. The analysis module 262 then permits the parameters to be retrieved from memory and presented on a display. In some embodiments the operations depicted in FIG. 4 may be initiated by a request from a user of the analysis module, i.e., a member of the flight crew, typically after a landing has occurred. In other embodiments the operations of FIG. 4 may be invoked automatically.

Thus, referring to FIG. 4, at operation 410 one or more of the parameters collected and stored in the operations depicted in FIG. 3 may be retrieved from memory, and at operation 415 the one or more parameters may be presented on a display screen. For example, in one embodiment the parameters may be presented on a display in the cockpit of the aircraft.

In some embodiments the analysis module 262 may also generate a hard landing indicator if one or more parameters indicate that the landing was a hard landing. For example, the system may compare one or more of the flight parameters and/or touchdown parameters to one or more thresholds or combinations of thresholds to determine whether a hard landing indicator should be presented. By way of example and not limitation, if the CG sink rate prior to touchdown exceeds 9 feet per second, then the landing may be considered to be a hard landing on the main gears. Similarly if the peak cg vertical acceleration during a touchdown event exceeds twice the force of gravity (2g), then the landing may be considered to be a hard landing on the main gears. Further, if the roll rate prior to touchdown exceeds 3 degrees per second and the pitch rate at the time of nose gear touchdown exceeds 8 degrees per second, then the landing may be considered to be a hard landing on both the main and nose gears. One skilled in the art will recognize that additional parameters and/or thresholds may be implemented.

Thus, at operation 420 the analysis module compares one or more of the parameters collected in the operations depicted in FIG. 3 to a threshold. The parameters can result from either the flight parameters collected in operation 315 or one or both of the touchdown parameters collected in operations 325 and 335. For example, the thresholds may be set by a manufacturer, designer, or operator of the aircraft. If, at operation 420, the parameters do not indicate a hard landing, then the analysis ends. By contrast, if at operation 420 the parameters indicate a hard landing then control passes to operation 425 and a hard landing indicator is presented on one or more user interfaces. For example, a visual hard landing indicator may be presented on the display 210, and may be associated with an audible hard landing indicator presented by an audible user interface, e.g., a speaker system coupled to the system 200.

Figure 5:
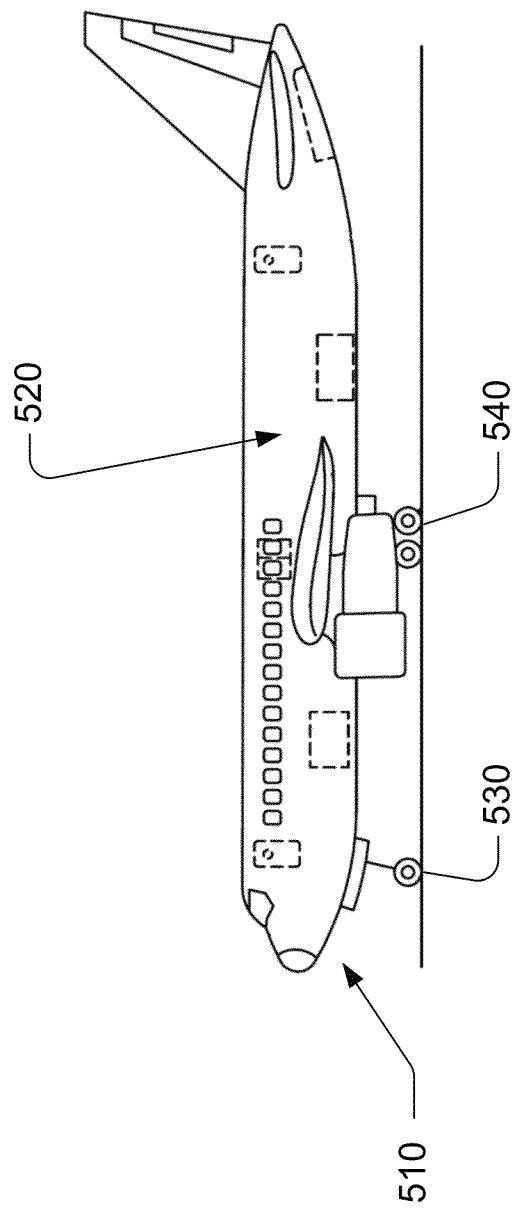
FIG. 5 is a schematic illustration of an aircraft utilizing a landing evaluation system, according to embodiments.

FIG. 5 is a schematic illustration of an aircraft 510 which may utilize a landing valuation system, according to embodiments. Referring to FIG. 5, the airplane 510 may be a commercial airline, cargo plane, or small passenger plane. The airplane 510 may comprise a fuselage 520, a nose landing gear 530 and a main landing gear 540.

Thus, as described herein an aircraft may be equipped with a landing evaluation system which records various flight and landing parameters during the landing process and may present the parameters on a display for consideration by one or more members of the flight crew. In addition, a hard landing indicator may be presented via a user interface. The flight crew may then use this information to determine whether to remove the plane from operation for inspection.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method of evaluating an aircraft landing, comprising:
   in response to detecting at least one landing trigger condition associated with a landing of an aircraft, storing one or more first flight parameters at a memory, wherein the one or more first flight parameters are associated with the landing, and wherein the one or more first flight parameters include a closure rate with the ground;
   in response to detecting at least one touchdown trigger condition corresponding to a touchdown associated with the landing, storing one or more second flight parameters at the memory, wherein the one or more second flight parameters are associated with the touchdown;
   determining, based on the closure rate and on the one or more second flight parameters, whether the landing is a hard landing; and
   in response to determining that the landing is a hard landing, initiating presentation of a hard landing indicator at a display device.

2. The method of claim 1, wherein detecting the at least one landing trigger condition comprises detecting that an altitude of the aircraft is below a threshold altitude.

3. The method of claim 1, wherein the one or more first flight parameters further include a date, a gross weight, a center of gravity (CG), a uniform time code (UTC), a pitch attitude, an airplane true heading, a selected runway heading, a roll angle, a body roll rate, and a CG norm acceleration measurement, or any combination thereof.

4. The method of claim 1, wherein detecting the at least one touchdown trigger condition comprises detecting a main gear touchdown event.

5. The method of claim 1, further comprising:
in response to detecting the at least one touchdown trigger condition:
storing a plurality of CG norm acceleration measurements over a time period; and
selecting a particular CG norm acceleration measurement of the plurality of CG norm acceleration measurements, wherein the one or more second flight parameters includes the particular CG norm acceleration measurement.

6. The method of claim 1, wherein the one or more second flight parameters include a timestamp, a gross weight measurement, a center of gravity measurement, or any combination thereof.

7. The method of claim 1, wherein detecting the at least one touchdown trigger condition comprises detecting a nose gear touchdown event.

8. The method of claim 1, further comprising:
in response to detecting the at least one touchdown trigger condition:
storing a plurality of body pitch rate measurements over a time period; and
selecting a particular body pitch rate measurement of the plurality of body pitch rate measurements, wherein the one or more second flight parameters includes the particular body pitch rate measurement.

9. The method of claim 1, wherein the closure rate is a center of gravity (CG) sink rate.

10. The method of claim 1, wherein determining whether the landing is a hard landing comprises:
determining whether the closure rate exceeds a first threshold; and
determining whether the one or more second flight parameters exceeds a second threshold.

11. An aircraft landing evaluation system, comprising:
a first sensor to detect at least one landing trigger condition associated with a landing of an aircraft;
a second sensor to detect at least one touchdown trigger condition corresponding to a touchdown associated with the landing;
a processor coupled to the first sensor and the second sensor; and
a memory coupled to the processor, wherein the memory stores instructions that, when executed by the processor, cause the processor to perform operations comprising:
in response to the at least one landing trigger condition, storing one or more first flight parameters associated with the landing, wherein the one or more first flight parameters includes a closure rate with the ground;
in response to the at least one touchdown trigger condition, storing one or more second flight parameters associated with the touchdown;
determining, based on the closure rate and on the one or more second flight parameters, whether the landing is a hard landing; and
in response to determining that the landing is a hard landing, initiating presentation of a hard landing indicator at a display device.

12. The aircraft landing evaluation system of claim 11, wherein detecting the at least one landing trigger condition includes detecting that an altitude of the aircraft is below a threshold altitude.

13. The method of claim 1, wherein the at least one landing trigger condition occurs before the aircraft touches down during the landing, wherein the one or more first flight parameters are stored as the aircraft descends, wherein the at least one touchdown trigger condition occurs after the aircraft touches down, and wherein one or more second flight parameters are stored after the aircraft has touched down.

14. The aircraft landing evaluation system of claim 11, wherein detecting the at least one touchdown trigger condition includes detecting a main gear touchdown event.

15. The aircraft landing evaluation system of claim 11, wherein the operations further comprise:
in response to the at least one touchdown trigger condition:
storing a plurality of CG norm acceleration measurements over a time period; and
selecting a particular CG norm acceleration measurement of the plurality of CG norm acceleration measurements, wherein the one or more second flight parameters includes the particular CG noun acceleration measurement.

16. The method of claim 1, wherein detecting the at least one touchdown trigger condition includes detecting that an aircraft pitch attitude transitions below a threshold.

17. The aircraft landing evaluation system of claim 11, wherein detecting the touchdown trigger condition includes detecting a nose gear touchdown event.

18. The aircraft landing evaluation system of claim 11, wherein the operations further include:
in response to the at least one touchdown trigger condition:
storing a plurality of body pitch rate measurements over a time period; and
selecting a particular body pitch rate measurement of the plurality of body pitch rate measurements, wherein the one or more second flight parameters include the particular body pitch rate measurement.

19. The aircraft landing evaluation system of claim 17, wherein the one or more second parameters includes a timestamp associated with the nose gear touchdown event.

20. The method of claim 1, wherein detecting the at least one touchdown trigger condition includes detecting that a truck becomes untilted.

21. A computer readable medium storing instructions that, when executed by a processor, cause the processor to perform operations comprising:
in response to detecting at least one landing trigger condition associated with a landing of an aircraft, storing one or more first flight parameters at a memory, wherein the one or more first flight parameters are associated with the landing, and wherein the one or more first flight parameters include a closure rate with the ground;
in response to detecting at least one touchdown trigger condition corresponding to a touchdown associated with the landing, storing one or more second flight parameters associated with the touchdown;
determining, based on the closure rate and on the one or more second flight parameters, whether the landing is a hard landing; and in response to determining that the landing is a hard landing, initiating presentation of a hard landing indicator at a display device.

* * * * *